United States Patent
Yang

(10) Patent No.: US 12,549,640 B2
(45) Date of Patent: Feb. 10, 2026

(54) SERVICE SCHEDULING METHOD AND APPARATUS, DEVICE, AND COMPUTER-READABLE STORAGE MEDIUM

(71) Applicant: Huawei Cloud Computing Technologies Co., Ltd., Gui'an New District (CN)

(72) Inventor: Guodong Yang, Beijing (CN)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 117 days.

(21) Appl. No.: 18/635,893

(22) Filed: Apr. 15, 2024

(65) Prior Publication Data
US 2024/0259475 A1    Aug. 1, 2024

Related U.S. Application Data

(63) Continuation of application No. PCT/CN2022/116540, filed on Sep. 1, 2022.

(30) Foreign Application Priority Data

Oct. 18, 2021 (CN) .......................... 202111211896.4

(51) Int. Cl.
*H04L 67/51* (2022.01)
*H04L 67/60* (2022.01)

(52) U.S. Cl.
CPC .............. *H04L 67/51* (2022.05); *H04L 67/60* (2022.05)

(58) Field of Classification Search
CPC ................................ H04L 67/51; H04L 67/60
USPC .......................................................... 709/223
See application file for complete search history.

(56) References Cited

U.S. PATENT DOCUMENTS

| | | | |
|---|---|---|---|
| 2004/0205004 A1 | 10/2004 | Bahl et al. | |
| 2009/0125624 A1* | 5/2009 | Chevalier | H04M 15/00 709/225 |
| 2015/0098465 A1 | 4/2015 | Caputo, II et al. | |
| 2020/0252332 A1* | 8/2020 | Ying | H04L 67/51 |

(Continued)

FOREIGN PATENT DOCUMENTS

| | | |
|---|---|---|
| CN | 110177054 A | 8/2019 |
| CN | 110830373 A | 2/2020 |

*Primary Examiner* — Wing F Chan
*Assistant Examiner* — Leon Y Tseng
(74) *Attorney, Agent, or Firm* — Leydig, Voit & Mayer, Ltd.

(57) ABSTRACT

This application discloses a service scheduling method and a device. The method includes: receiving service configuration information input by a user, where the service configuration information includes a network service level required by a service; obtaining a first service packet, where the first service packet carries content and a target level label of the service, and the target level label is used to identify the network service level required by the service; then matching the target level label with a plurality of level labels in a first routing table; when the target level label matches any one of the plurality of level labels, determining a target port label based on the level label obtained through matching; and finally, controlling a point of presence to send the first service packet from a target port indicated by the target port label to a client.

20 Claims, 6 Drawing Sheets

(56) References Cited

U.S. PATENT DOCUMENTS

2020/0351243 A1* 11/2020 Lu ........................... H04L 67/60
2022/0385575 A1* 12/2022 Langemak .............. H04L 45/38

* cited by examiner

SERVICE SCHEDULING METHOD AND APPARATUS, DEVICE, AND COMPUTER-READABLE STORAGE MEDIUM

CROSS-REFERENCE TO RELATED APPLICATIONS

This application is a continuation of International Application No. PCT/CN2022/116540, filed on Sep. 1, 2022, which claims priority to Chinese Patent Application No. 202111211896.4, filed on Oct. 18, 2021. The disclosures of the aforementioned applications are hereby incorporated by reference in their entireties.

TECHNICAL FIELD

This application relates to the field of cloud computing technologies, and in particular, to a service scheduling method and apparatus, device, and a computer-readable storage medium.

BACKGROUND

In a trend of cloud computing, a large quantity of customers choose to purchase a cloud service from a cloud vendor. To ensure good service experience (for example, better network quality and redundancy protection) of a customer, a cloud network deployed by the cloud vendor usually establishes, according to a border gateway protocol (BGP), a BGP neighbor with an internet service provider (ISP) network deployed by a carrier, to achieve communication.

Because a route determined according to a BGP route selection rule may not be an optimal route for implementing communication, a solution used by the cloud vendor is: detecting network quality of a communication line between the cloud network and each ISP network, determining a line with better network quality, and then providing a cloud service for the customer through the line. However, a problem of this solution is as follows: When the line is congested or a network capacity is insufficient, all services can be provided for the customer only through a candidate line, that is, a high-level service and a low-level service are provided for the customer through a same candidate line. Consequently, for the high-level service, network experience of the customer is degraded.

Therefore, how to provide better network quality for the customer is still an urgent problem that needs to be resolved currently.

SUMMARY

This application discloses a service scheduling method and apparatus, device, and a computer-readable storage medium, to provide better network quality for a customer.

According to a first aspect, this application provides a service scheduling method. The method includes: receiving service configuration information input by a user, where the service configuration information includes a network service level required by a service; obtaining a first service packet, where the first service packet carries content and a target level label of the service, and the target level label is used to identify the network service level required by the service; then matching the target level label with a plurality of level labels in a first routing table, where the first routing table includes the plurality of level labels and a port label corresponding to each level label; when the target level label matches any one of the plurality of level labels, determining a target port label based on the level label obtained through matching, where the target port label is used to identify a target port of a point of presence (POP); and finally, controlling the POP to send the first service packet from the target port to a client.

According to the method provided in the first aspect, based on a network service level that is required by a service configured by the user, a corresponding network resource is configured for the service, so that services that require different network resources may be sent to the client by using different network resources. This achieves an objective that a high-level service has a high-quality network resource.

In a possible implementation, the service configuration information further includes a port number of a server port, and the obtaining a first service packet includes: receiving a second service packet sent by a server via the server port, where the second service packet is a packet generated by the server in response to a service request of the service sent by the client; and then adding the target level label to the second service packet based on the port number of the server port, to obtain the first service packet.

In the foregoing implementation, the user notifies the server of the network service level required by the service by configuring the port number of the server port, to add a corresponding target level label to the second service packet.

In another possible implementation, the service configuration information further includes a port number of a server port, and the obtaining a first service packet includes: sending the service configuration information to a server, so that the server adds a target level label to a second service packet based on the port number of the server port, where the second service packet is a packet generated by the server in response to a service request of the service sent by the client; and then receiving the first service packet sent by the server via the server port, where the first service packet is the second service packet to which the target level label is added.

In the foregoing implementation, the server may determine, based on the port number of the server port configured by the user, the port that sends the second service packet, so that a device receiving the second service packet determines the network service level required by the service.

In a possible implementation, the controlling the POP to send the first service packet from the target port to a client includes: adding the target port label to the first service packet; and sending, to the POP, the first service packet to which the target port label is added, so that the POP sends the first service packet from the target port to the client based on the target port label.

In the foregoing implementation, forwarding of the POP is controlled by adding the target port label to the first service packet, and a complex forwarding policy or a newly added protocol is not needed to be configured for the POP, so that configuration of the POP and a manner of forwarding a service packet by the POP can be simplified.

In a possible implementation, before the matching the target level label with a plurality of level labels in a first routing table, the method further includes: detecting network performances of a network segment to which the client belongs on a plurality of ports of the POP, where the plurality of ports are connected to a plurality of internet service provider ISP networks; selecting M ports from the plurality of ports based on the network service level required by the service, where M is an integer greater than 1;

determining that a network performance of the network segment is optimal on the target port in the M ports; and then obtaining the target port label corresponding to the target port, and storing the target port label and the target level label to the first routing table in an associated manner. In this way, a network resource may be dynamically configured for the service based on an actual situation, so that a service that requires a better network resource is always sent to the client by using a high-level network.

In a possible implementation, before the detecting network performances of a network segment to which the client belongs on a plurality of ports of the POP, the method further includes: collecting traffic of the network segment, and determining that the traffic of the network segment is greater than a threshold. In this way, costs of detecting the network performance of the network segment may be reduced.

In a possible implementation, the method further includes: when the target level label does not match any one of the plurality of level labels, forwarding the first service packet to the POP based on a second routing table, where the second routing table includes a next-hop address, and the next-hop address is an internet protocol (IP) address of the POP. In this way, it may be ensured that a service packet requested by the client can reach the client.

According to a second aspect, this application provides a service scheduling apparatus. The apparatus includes a service management unit and a forwarding unit. The service management unit is configured to receive service configuration information input by a user, where the service configuration information includes a network service level required by a service. The forwarding unit is configured to: obtain a first service packet, where the first service packet carries content and a target level label of the service, and the target level label is used to identify the network service level required by the service; match the target level label with a plurality of level labels in a first routing table, where the first routing table includes the plurality of level labels and a port label corresponding to each level label; when the target level label matches any one of the plurality of level labels, determine a target port label based on the level label obtained through matching, where the target port label is used to identify a target port of a POP; and then control the POP to send the first service packet from the target port to a client.

In a possible implementation, the service configuration information further includes a port number of a server port; and the forwarding unit is configured to: receive a second service packet sent by a server via the server port, where the second service packet is a packet generated by the server in response to a service request of the service sent by the client; and add a target level label to the second service packet based on the port number of the server port, to obtain the first service packet.

In another possible implementation, the configuration information further includes a port number of a server port; the service management unit is configured to send the service configuration information to the server, so that the server adds a target level label to a second service packet based on the port number of the server port, where the second service packet is a packet generated by the server in response to a service request of the service sent by the client; and the forwarding unit is configured to receive the first service packet sent by the server via the server port, where the first service packet is the second service packet to which the target level label is added.

In a possible implementation, the forwarding unit is configured to: add the target port label to the first service packet; and send, to the POP, the first service packet to which the target port label is added, so that the POP sends the first service packet from the target port to the client based on the target port label.

In a possible implementation, the apparatus further includes a data collection unit, where the data collection unit is configured to detect network performances of a network segment to which the client belongs on a plurality of ports of the POP, and the plurality of ports are connected to a plurality of internet service provider ISP networks; and the service management unit is further configured to: select M ports from the plurality of ports based on the network service level required by the service, where M is an integer greater than 1; then determine that a network performance of the network segment is optimal on the target port in the M ports; and then obtain the target port label corresponding to the target port, and store the target port label and the target level label to the first routing table in an associated manner.

In a possible implementation, the data collection unit is further configured to collect traffic of the network segment; and the service management unit is further configured to determine that traffic of the network segment is greater than a threshold.

In a possible implementation, the forwarding unit is further configured to: when the target level label does not match any one of the plurality of level labels, forward the first service packet to the POP based on a second routing table, where the second routing table includes a next-hop address, and the next-hop address is an internet protocol IP address of the POP.

According to a third aspect, this application provides a computing device. The computing device includes a processor and a memory, the memory stores computer instructions, and the processor executes the computer instructions, so that the computing device is enabled to perform the method described in any one of the first aspect or the implementations of the first aspect.

According to a fourth aspect, this application provides a computer-readable storage medium. The computer-readable storage medium stores computer instructions; and when the computer instructions are executed by a computing device, the computing device performs the method described in any one of the first aspect or the implementations of the first aspect.

DESCRIPTION OF EMBODIMENTS

The following describes technical solutions provided in this application with reference to accompanying drawings.

To make the technical solutions provided in this application clearer, before the technical solutions provided in this application are described, related terms in this application are first described.

An ISP network is deployed by a carrier, to provide services such as a dial-up internet service, online browsing, file download, and email sending and receiving. It is an entrance and bridge for an internet end user to access an internet.

A BGP is a routing protocol that implements route reachability between different autonomous systems (ASs). On the Internet, an AS is a set of networks that use a same routing policy and that are managed by an entity (for example, a cloud vendor or the carrier). Therefore, a network deployed by the cloud vendor (which is hereinafter referred to as a cloud network) and the ISP network may be interconnected based on the BGP.

Figure 1:
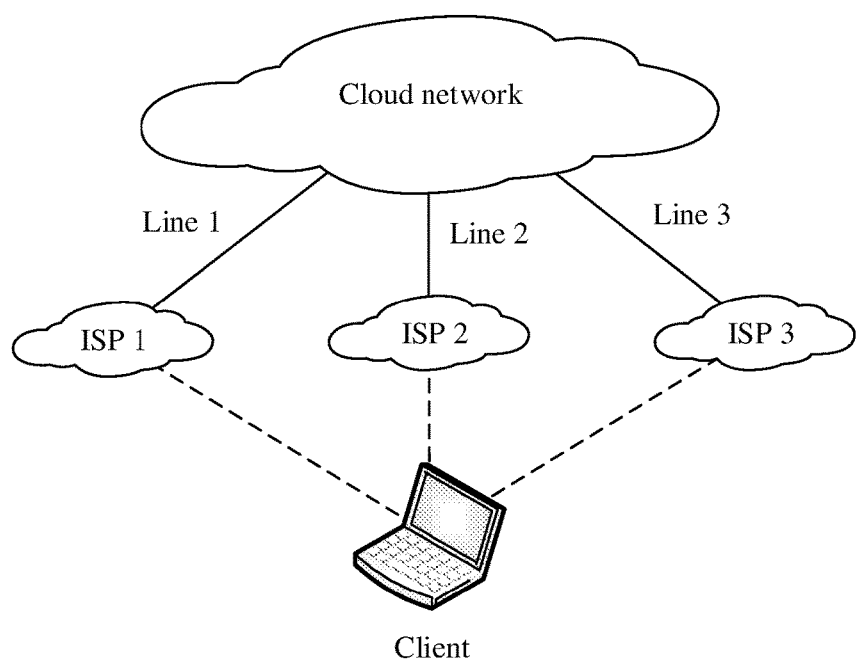
FIG. 1 is a schematic diagram of a scenario of implementing service scheduling based on BGP according to this application.

In a scenario in which service scheduling is implemented based on the BGP, as shown in FIG. 1, a BGP neighbor is established between the cloud network and a plurality of ISP networks (including an ISP 1, an ISP 2, and an ISP 3). In this way, after a user rents resources (including a computing resource, a storage resource, and a network resource) from the cloud vendor, a client of the user may obtain a cloud service from the rented resources by using the plurality of ISP networks. In other words, the cloud vendor may allocate a proper network resource to the client of the user based on network quality of communication lines (a line 1, a line 2, and a line 3 shown in FIG. 1) between the cloud network and the ISP networks, to provide better network quality for the client of the user. In FIG. 1, network quality of the line 1 is better than that of the line 2 and the line 3. Therefore, the cloud vendor provides the cloud service for the client by using the ISP 1 network. In addition, if the ISP 1 network is faulty, the cloud vendor may further allocate another ISP network (for example, the ISP 2 in FIG. 1) to the client, to provide network redundancy protection for the user.

With increasing service access traffic, network congestion becomes a major problem that affects the user form obtaining the cloud service. Therefore, this application provides a service system. In the system, a user may configure a network service level (namely, a service level) required by a service. Then, the system may configure a corresponding network resource for the service based on the network service level required by the service, so that services of different levels may be sent to a client by using different network resources. This achieves an objective that a high-level service has a high-quality network resource.

Figure 2:
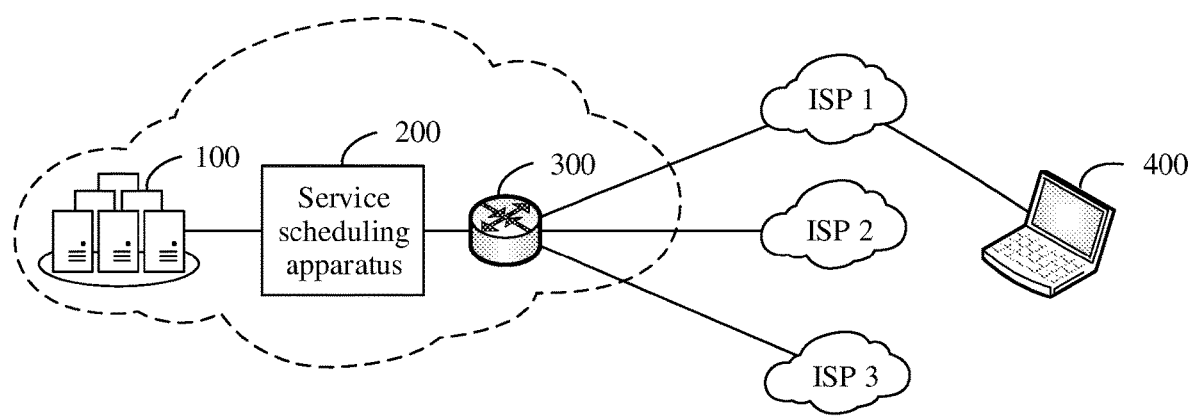
FIG. 2 is a schematic diagram of a structure of a service system according to this application.

FIG. 2 is a schematic diagram of a structure of a service system according to this application. As shown in FIG. 2, the system includes a server 100, a service scheduling apparatus 200, a POP 300, and a client 400. In this embodiment of this application, after the client 400 sends a service request to the server 100, the server 100 generates a corresponding service packet based on the service request, and sends the service packet to the service scheduling apparatus 200. The service scheduling apparatus 200 receives the service packet, and allocates a corresponding network resource to the service packet based on a network service level required by a service, to indicate the POP 300 to send the service packet to the client 400. In this way, the client 400 may obtain a service provided by the server 100.

The following describes parts of the service system.

The server 100 means resources (including a computing resource, a storage resource, and a network resource) purchased by a user from a cloud vendor. The server 100 may include a plurality of devices (including a computing device, a storage device, and a network device), for example, a plurality of devices in a data center (DC) built by the cloud vendor or a plurality of devices in an equipment room. In embodiments of this application, the user is a user who registers a cloud account and purchases a resource from the cloud vendor.

The server 100 is configured to provide a cloud service for the client 400, and the client 400 may include a mobile phone, a portable computer or a tablet computer. For example, the user is a video platform. The video platform purchases a cloud service of a video on demand service from the cloud vendor. The client 400 includes the following two types: a live streamer client and an audience client. In this case, the cloud service provided by the server 100 for the client 400 includes: The live streamer client may upload a produced short video to the server 100 for caching, and the audience client may obtain the short video from the server 100.

Optionally, the server 100 may provide the cloud service for the client 400 in a form of a service packet. In this case, the server 100 is configured to receive the service request sent by the client 400, and generate, based on the service request, a service packet carrying service content. It should be understood that, because the service content is carried in the service packet, in this case, after receiving the service packet, the client 400 may obtain the corresponding service content, and obtain the cloud service.

During actual application, the user may purchase a cloud service for a plurality of services, and different services have different requirements for the network resource. For example, a latency requirement of a video live broadcast service is higher than a latency requirement of the video on demand service. Therefore, a network resource requirement of the video live broadcast service is higher than a network resource requirement of the video on demand service. In this case, a better network resource needs to be provided in a process of providing the video live broadcast service for the client 400. Therefore, the service system provided in this application includes the service scheduling apparatus 200. The server 100 is further configured to send the service packet to the service scheduling apparatus 200.

The service scheduling apparatus 200 is configured to receive the service packet sent by the server 100, and allocate a corresponding network resource to the service packet based on the network service level required by the service, to indicate the POP 300 to send the service packet to the client 400. Details are as follows:

The service scheduling apparatus 200 is configured to receive service configuration information input by a user, where the service configuration information includes the network service level required by the service. In a possible implementation, the service scheduling apparatus 200 is further configured to send the configuration information to the server 100. The server 100 is further configured to add a corresponding level label to the generated service packet based on the configuration information, and send, to the service scheduling apparatus 200, the service packet to which the level label is added. In another possible implementation, the service scheduling apparatus 200 is further configured to receive the service packet sent by the server 100, and add the level label to the service packet based on the configuration information.

The service scheduling apparatus 200 is further configured to collect network data of a cloud network. The network data includes but is not limited to: network performances of a plurality of network segments, traffic of the plurality of network segments, and route monitoring information. The network segment is a network segment to which the client 400 belongs. The network performance of the network segment includes but is not limited to the following parameters: a packet loss rate and the latency. The packet loss rate means a ratio of a quantity of lost data packets to a total quantity of transmitted data packets in data packets transmitted through the network segment. The latency means time consumed when a single data packet is transmitted through the network segment. The route monitoring information includes border gateway protocol monitoring protocol (BMP) routing information stored in the POP 300, namely, all BGP routing information received by the POP 300 from a BGP peer and withdrawn BGP routing information. In embodiments of this application, a BGP peer of the POP 300 is an ISP network that establishes a connection with the POP 300 according to a BGP. Optionally, the route monitoring information further includes BGP routing information selected by the POP 300 from the BMP routing information according to a BGP route selection rule.

The service scheduling apparatus 200 is further configured to calculate, based on the network data and the service configuration information, different routing entries for services that need different network services, to obtain a first routing table. The first routing table includes a plurality of level labels and a port label corresponding to each level label. The level label is used to identify the network service level (namely, a service level) required by the service, and a port label corresponding to the level label is used to identify a port on the POP 300. The service scheduling apparatus 200 is further configured to match the level label carried in the service packet with the plurality of level labels in the first routing table, and if the matching succeeds, add the corresponding port label to the service packet, and send, to the POP 300, the service packet to which the port label is added.

The POP 300 is a local access point of the cloud network, and the cloud network is a network resource rented by the user. Optionally, the POP 300 may be a router, a switch, a server, or another data communication device. This is not limited in this application. The POP 300 is configured to establish a communication connection between the cloud network and a plurality of ISP networks (for example, an ISP 1, an ISP 2, and an ISP 3 in FIG. 2), so that the client 400 can access the cloud network, to obtain the cloud service provided by the server 100.

Optionally, the POP 300 includes a plurality of ports, and one port is connected to one ISP network. It should be noted that, "port connected to the ISP network on the POP 300" may have different names. For example, different standards, different versions of a same standard, different vendors, and different application scenarios may have different names for "port connected to the ISP network on the POP 300". For example, "port connected to the ISP network on the POP 300" may also sometimes be referred to as an "egress line".

In this embodiment of this application, each of the plurality of ports corresponds to one port label. The port label of the port may be preset by the user, or may be defined by the POP 300. The POP 300 is further configured to store a correspondence between the port and the port label, and send the port label to the service scheduling apparatus 200, so that the service scheduling apparatus 200 can configure the first routing table.

The POP 300 is further configured to receive a service packet that is sent by the service scheduling apparatus 200 and that carries the port label, and send the service packet to the client 400 by using a port indicated by the port label.

Because of functions of the foregoing parts, the service system provided in this application can configure the corresponding network resource for the service based on the network service level required by the service, so that services of different levels can be sent to the client by using different network resources. In addition, when network resources of an ISP network are insufficient, a high-priority service can preferentially use a high-quality network resource.

Figure 3:
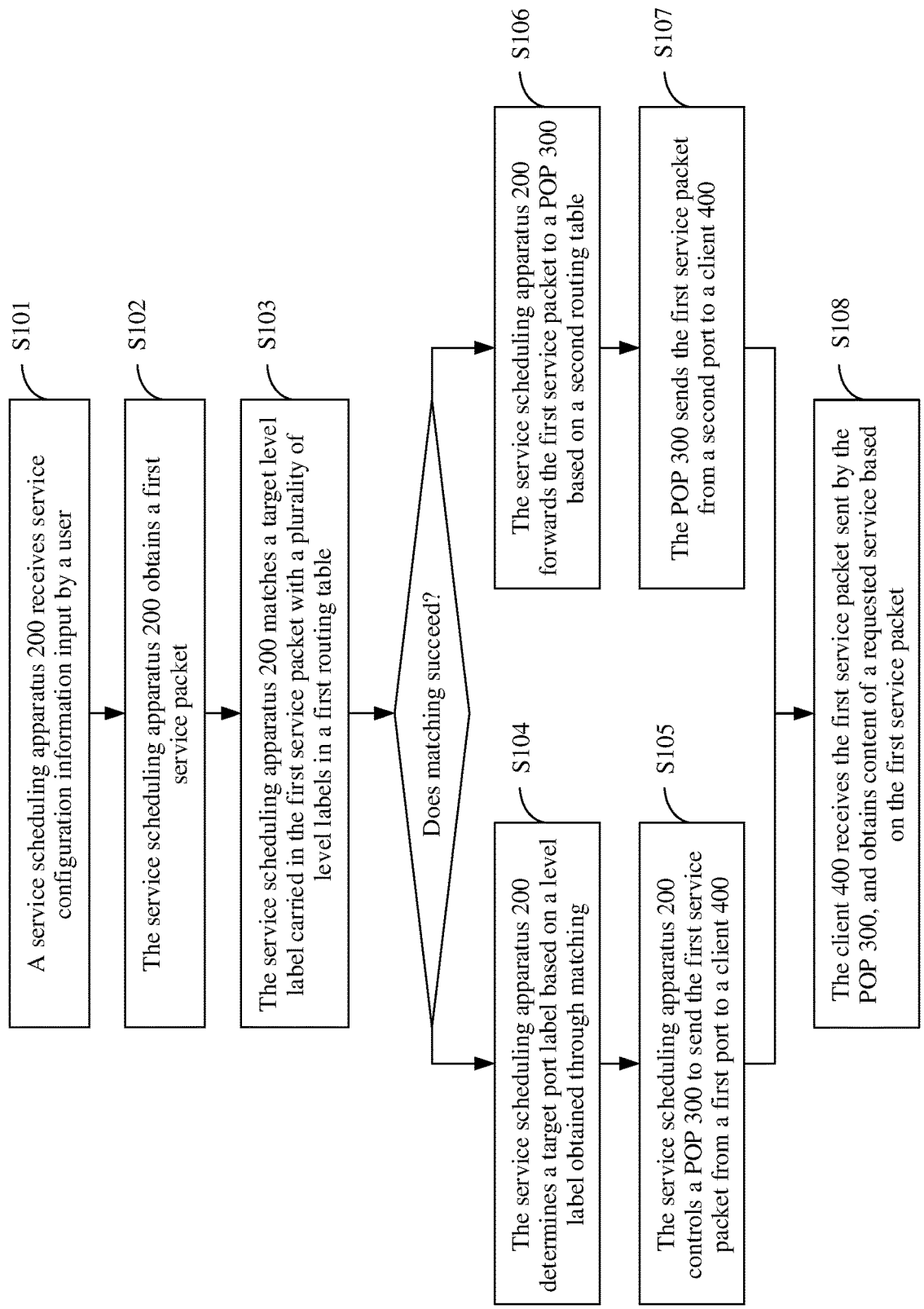
FIG. 3 is a schematic flowchart of a service scheduling method according to this application.

With reference to FIG. 3, the following describes in more detail a process of implementing service scheduling by using the foregoing service system.

FIG. 3 is a schematic flowchart of a service scheduling method according to this application. The method includes but is not limited to the following steps.

S101: A service scheduling apparatus 200 receives service configuration information input by a user.

The service configuration information includes a network service level required by a service. The network service level indicates network quality. In this embodiment of this application, the service scheduling apparatus 200 provides a plurality of network service levels for the user for selection.

Optionally, the service configuration information further includes a port number of a server port A, and the server port A is a port of a server 100. It should be understood that service packets of different services may be transmitted by using different ports. For example, a hypertext transfer protocol (HTTP) packet of an internet access service may be transmitted by using a port 8080, and a live stream of a video live broadcast service may be transmitted by using a port 1935.

Optionally, the service configuration information further includes identifier information of the user. In embodiments of this application, an identifier of the user may be an elastic public network (elastic IP, EIP) address purchased by the user.

Figure 4:
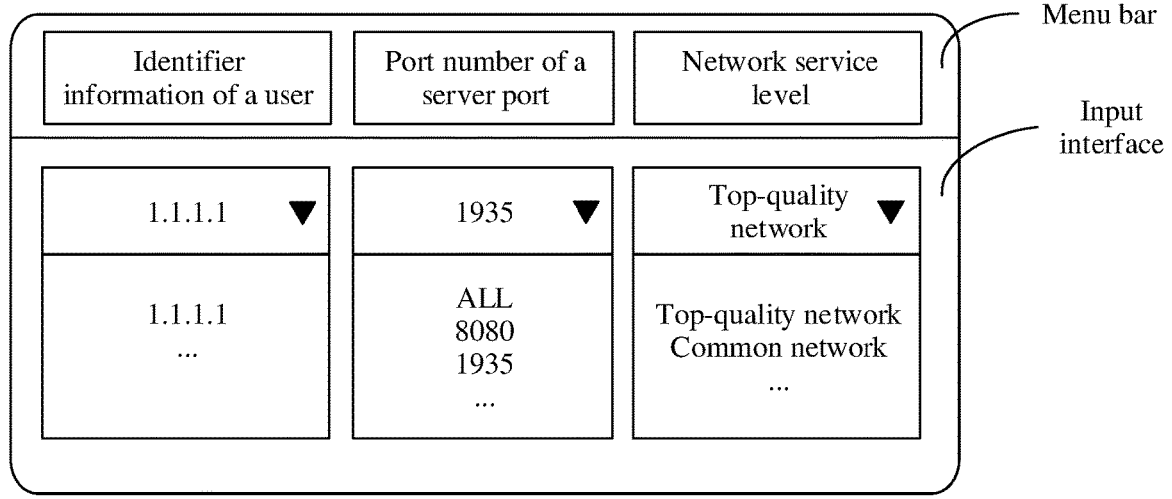
FIG. 4 is a schematic diagram of a user interface according to this application.

In a embodiment, the service scheduling apparatus 200 provides a user interface (UI) for the user, and the user completes inputting of the service configuration information by performing an operation on the UI. As shown in FIG. 4, the UI includes a menu bar and an input interface, and the menu bar includes three items: identifier information of the user, a port number of a server port, and the network service level. The network service level includes a top-quality network and a common network. A network service level of the top-quality network is higher than a network service level of the common network, that is, network quality of the top-quality network is better than network quality of the common network. It is assumed that the EIP address purchased by the user from a cloud vendor is 1.1.1.1, and a purchased cloud service is the video live broadcast service. In this case, the identifier information of the user is 1.1.1.1, and the port number of the server port is 1935. Considering that the video live broadcast service has a high requirement on a latency, a network service level configured by the user for the video live broadcast service may be the top-quality network.

S102: The service scheduling apparatus 200 obtains a first service packet.

The first service packet carries content and a target level label of the service, where the target level label is used to identify the network service level required by the service.

In an example, that the service scheduling apparatus 200 obtains a first service packet includes: The service scheduling apparatus 200 receives a second service packet sent by the server 100. In response to a service request of the service sent by a client 400, the server 100 generates the second service packet based on the service request, where the second service packet carries the content of the service. The server 100 receives the service configuration information sent by the service scheduling apparatus 200, and adds the target level label to the second service packet based on the service configuration information, to obtain the first service packet.

The server 100 stores a correspondence between port numbers of a plurality of server ports and a plurality of level labels. The port numbers of the plurality of server ports include the port number of the server port A, and the plurality of level labels include the target level label. In this case, that the server 100 adds the target level label to the second service packet based on the service configuration information includes: The server 100 monitors the server port A. When determining to send the service packet from the server port A, the server 100 determines the target level label based on the foregoing correspondence, and adds the target level label to the second service packet.

Further, considering that a differentiated services code point (DSCP) value in an internet protocol (IP) packet header may be used to distinguish different priorities, this embodiment of this application proposes that different DSCP values are used as different level labels. In this case, the target level label may be a DSCP value, for example, 12 or 16. Optionally, the target level label may alternatively be a letter, a character string, a digit, a combination of a digit and a letter, or the like. In addition, the target level label may be added to a header of the service packet, a tail of the service packet, or the service packet. This is not limited in this application.

In another example, that the service scheduling apparatus 200 obtains a first service packet includes: The service scheduling apparatus 200 receives the second service packet sent by the server 100. Then, the service scheduling apparatus 200 adds the target level label to the second service packet based on the service configuration information, to obtain the first service packet.

The service scheduling apparatus 200 stores the correspondence between the port numbers of the plurality of server ports and the plurality of level labels. The port numbers of the plurality of server ports include the port number of the server port A, and the plurality of level labels include the target level label. That the service scheduling apparatus 200 adds the target level label to the second service packet based on the service configuration information includes: After receiving the second service packet sent from the server port A, the service scheduling apparatus 200 determines the target level label based on the foregoing correspondence, and adds the target level label to the second service packet.

S103: The service scheduling apparatus 200 matches the target level label carried in the first service packet with a plurality of level labels in a first routing table. If the target level label matches any one of the plurality of level labels, S104, S105 and S108 are performed; or if the target level label does not match any one of the plurality of level labels, S106 to S108 are performed.

In a embodiment, the service scheduling apparatus 200 stores the first routing table. The first routing table includes the plurality of level labels and a port label corresponding to each level label, where the plurality of level labels include the target level label, and the port label corresponding to each level label is used to identify a port of a POP 300.

In a embodiment, the service scheduling apparatus 200 may configure the first routing table by using the following steps:

Step ①: The service scheduling apparatus 200 detects network performances of a plurality of network segments.

The plurality of network segments include a network segment to which the client 400 belongs. The network performance of the network segment includes but is not limited to the following parameters: a packet loss rate and a latency. The packet loss rate means a ratio of a quantity of lost data packets to a total quantity of transmitted data packets in data packets transmitted through the network segment. The latency means time consumed when a single data packet is transmitted through the network segment.

The service scheduling apparatus 200 collects routing information sent by a plurality of ISP networks to the POP 300, determines the plurality of network segments based on the routing information, and detects the network performances of these network segments. It should be understood that, during actual application, to ensure that the client 400 can access the server 100, before sending the service request to the server 100, the client 400 first sends the routing information to the server 100 by using the ISP network and the POP 300, and then forwards the service request based on the routing information. In this embodiment of this application, the POP 300 is connected to the plurality of ISP networks. Therefore, the POP 300 receives the routing information reported by the plurality of ISP networks. Because the routing information includes a source IP address segment, and an IP address of the client 400 belongs to the source IP address segment, the service scheduling apparatus 200 may obtain a plurality of source IP address segments based on the collected routing information. The plurality of source IP address segments herein are the plurality of network segments in which the service scheduling apparatus 200 needs to detect the network performances.

In a embodiment, after receiving the routing information reported by the plurality of ISP networks, the POP 300 periodically sends the routing information to the service scheduling apparatus 200, so that the service scheduling apparatus 200 obtains the routing information. Alternatively, the service scheduling apparatus 200 may monitor the port of the POP 300. After the port of the POP 300 receives the routing information reported by the ISP network, the POP 300 is controlled to send the routing information to the service scheduling apparatus 200.

Optionally, the service scheduling apparatus 200 may detect the network performances of the plurality of network segments in the following manner. For example, the service scheduling apparatus 200 detects a network performance of one network segment: The service scheduling apparatus 200 controls the POP 300 to separately send, from a plurality of ports, probe packets (for example, ping packets) to clients belonging to the network segment, and then determines a network performance of the network segment on each port based on probe response packets received by the POP 300. It should be noted that a network performance of the network segment on one port means: A probe packet is sent from a port of the POP 300 to a client belonging to the network segment. Then, the port receives a probe response packet returned by the client, and obtains the packet loss rate and the latency by analyzing the probe packet sent from the port and the received probe response packet, to serve as the network performance of the network segment on the port. Therefore, in embodiments of this application, the network performance of the network segment on one port may be understood as a network performance of an ISP network corresponding to the port.

It should be understood that, in the foregoing process of detecting the network performance of the network segment, because there may be a plurality of clients belonging to one network segment, a network performance of one network segment on one port may be obtained in the following manner: The service scheduling apparatus 200 separately sends, from one port, probe packets to a plurality of clients belonging to a same network segment, to obtain a plurality of corresponding probe response packets, then obtains a plurality of network performances based on the plurality of probe response packets, superimposes the plurality of network performances, and uses the superimposed network performance as the network performance of the network segment on one port. It can be learned from the foregoing descriptions that the network performance of the network segment includes at least one of the packet loss rate and the latency. Therefore, the plurality of network performances may be superimposed in the following manner: calculating an average value of a plurality of packet loss rates, calculating an average value of a plurality of latencies, and then using the average value of the plurality of packet loss rates and the average value of the plurality of latencies as the superimposed network performance.

For example, it is assumed that POP 300 has two ports: a port 1 and a port 2, and a client 1 and a client 2 belong to a network segment A. In this case, the service scheduling apparatus 200 controls the POP 300 to separately send the ping packets to the client 1 and the client 2 from the port 1, to obtain a network performance 1 and a network performance 2. The service scheduling apparatus 200 further controls the POP 300 to separately send the ping packets to the client 1 and the client 2 from the port 2, to obtain a network performance 3 and a network performance 4. Then, the service scheduling apparatus 200 superimposes the network performance 1 and the network performance 2, and uses the superimposed network performance as a network performance of the network segment A on the port 1; and the service scheduling apparatus 200 superimposes the network performance 3 and the network performance 4, and uses the superimposed network performance as a network performance of the network segment A on the port 2.

Considering that, during actual application, a large quantity of clients access the server 100 at a moment or in a time period, and the clients may belong to different network segments, therefore, after the service scheduling apparatus 200 obtains a large quantity of network segments, if the service scheduling apparatus 200 performs network detection on each network segment, a large quantity of costs are consumed. In addition, considering that, in the foregoing large quantity of network segments, clients belonging to network segments seldom access the server 100, in order to reduce costs of detecting the network performance of the network segment, before detecting the network performances of the plurality of network segments, the service scheduling apparatus 200 may further perform S1032.

Step ②: The service scheduling apparatus 200 collects traffic of the plurality of network segments, and performs network performance detection on a network segment whose traffic is greater than a threshold.

In this embodiment of this application, a NetStream protocol is deployed on the port of the POP 300. Egress traffic of the port may be monitored in real time according to NetStream, traffic sent to different network segments is analyzed, and then information obtained through analysis is sent to the service scheduling apparatus 200. In this way, the service scheduling apparatus 200 may determine traffic of each network segment. Then, the service scheduling apparatus 200 determines the network segment whose traffic is greater than the threshold in the plurality of network segments, and performs network performance detection on the Network segment whose traffic is greater than the threshold.

Step ③: The service scheduling apparatus 200 collects route monitoring information, and determines a plurality of ports of the POP 300.

The route monitoring information includes border gateway protocol monitoring protocol (BMP) routing information stored in the POP 300, namely, all BGP routing information received by the POP 300 from a BGP peer and withdrawn BGP routing information. In embodiments of this application, a BGP peer of the POP 300 is an ISP network that establishes a connection with the POP 300 according to a BGP. Optionally, the route monitoring information further includes BGP routing information selected by the POP 300 from the BMP routing information according to a BGP route selection rule.

During implementation, the POP 300 may periodically send the route monitoring information to the service scheduling apparatus 200. Alternatively, the service scheduling apparatus 200 may monitor the port of the POP 300. When receiving BGP routing information or a BGP route update message sent by the ISP network, the POP 300 is controlled to send the BGP routing information or the BGP route update message to the service scheduling apparatus 200. After obtaining the route monitoring information, the service scheduling apparatus 200 may determine, based on the route monitoring information, the plurality of ISP networks connected to the POP 300 and a port that is on the POP 300 and that is connected to each ISP network.

Step ④: The service scheduling apparatus 200 obtains port labels of the plurality of ports of the POP 300.

It can be learned from the foregoing descriptions that the POP 300 includes the plurality of ports, and each port has one port label. The port label may be defined by the POP 300, or may be set by the user. This is not limited herein. The POP 300 sends the port labels of the plurality of ports to the service scheduling apparatus 200, so that the service scheduling apparatus 200 may obtain the port labels of the plurality of ports.

Step ⑤: The service scheduling apparatus 200 allocates M ports to the service based on the service configuration information, where M is an integer greater than 1.

The service scheduling apparatus 200 obtains, based on the service configuration information, the network service level required by the service, and then selects the M ports from the foregoing plurality of ports based on the network service level required by the service, to serve as ports for transmitting the service packet of the service.

In this embodiment of this application, if the service requires a higher network service level, the service scheduling apparatus 200 may allocate more ports to the service. In this way, the service packet of the service may be sent to the client 400 by using the plurality of ports. In other words, a network with an optimal network performance may be selected from the plurality of ISP networks to send the service packet of the service to the client 400, so that the client 400 requesting the service obtains better service experience.

For example, it is assumed that the cloud vendor may provide two types of network services, one is the top-quality network, and the other is the common network. The POP 300 includes three ports: the port 1, the port 2, and a port 3. The port 1 is configured to connect to an ISP network deployed by a carrier A, the port 2 is configured to connect to an ISP network deployed by a carrier B, and the port 3 is configured to connect to an ISP network deployed by a carrier C. In this case, when the user configures the network service level required by the service as the top-quality network, ports that may be allocated by the service scheduling apparatus 200 to the service include the port 1, the port 2, and the port 3. When the user configures the network service level required by the service as the common network, a port that is allocated by the service scheduling apparatus 200 to the service includes the port 1.

It should be noted that execution sequences of S1031, S1033, and S1034 is not limited in this embodiment of this application. That is, the execution sequences of S1031, S1033, and S1034 may be interchanged, or may be simultaneously performed.

Step ⑥: The service scheduling apparatus 200 determines, based on the network performances of the plurality of network segments detected in S1031, a port corresponding to an optimal network performance of each network segment in the M ports and a port label of the port.

One network segment is used as an example. Because the network segment may have different network performances on different ports, in order to enable a client requesting a service to obtain a better service (for example, obtain the service packet more quickly), the service scheduling apparatus 200 may determine, based on network performances of the network segment on a plurality of ports, a port of the M ports with an optimal network performance of the network segment, to transmit the service packet by using the port.

For example, the service scheduling apparatus 200 separately detects network performances of the network segment A on the port 1, the port 2, and the port 3. Network performance of the network segment A on the port 3>Network performance of the network segment A on the port 1>Network performance of the network segment A on the port 2. The M ports include the port 1 and the port 3. The service scheduling apparatus 200 selects, based on the network performances of the network segment A on the port 1 and the port 3, the port 3 from the port 1 and the port 3 as a port for transmitting the service packet.

Step ⑦: The service scheduling apparatus 200 obtains the first routing table through configuration based on a level label that is in the service configuration information and that corresponds to the network service level required by the service, prefixes of the plurality of network segment, and the plurality of port labels determined in S1035.

The first routing table includes the plurality of level labels, the prefixes of the plurality of network segment, a plurality of port labels, and a plurality of next-hop addresses. The plurality of level labels correspond to a plurality of network service levels, and the plurality of level labels include the foregoing target level label. The prefixes of the plurality of network segment are network segment prefixes to which a destination IP address belongs, and the prefixes of the plurality of network segment include prefixes of a network segment to which the client requesting the service belongs. The plurality of port labels include a target port label. All the plurality of next-hop addresses are IP addresses of the POP 300, for example, the first routing table shown in Table 1. It should be understood that, because the port label in the first routing table is determined by the service scheduling apparatus 200 based on the network service level required by the service and network performances of different network segments on different ports, the port label in the first routing table corresponds to the prefix and a level label of the network segment.

TABLE 1

| | First routing table | | |
|---|---|---|---|
| Level label | Prefix of a network segment | Port label | Next-hop address |
| G1 | 1.1.1.0/24 | P1 | IP address of a POP 300 |
| G1 | 2.2.2.0/24 | P2 | IP address of the POP 300 |
| ... | ... | ... | ... |
| G2 | 1.1.1.0/24 | P5 | IP address of the POP 300 |

S104: The service scheduling apparatus 200 determines the target port label based on the level label obtained through matching. The target port label is used to identify a first port of the POP 300.

S105: The service scheduling apparatus 200 controls the POP 300 to send the first service packet from the first port to the client 400.

In a embodiment, that the service scheduling apparatus 200 controls the POP 300 to send the first service packet from the first port to the client 400 includes: The service scheduling apparatus 200 adds the target port label to the first service packet, and then sends, to the POP 300, the first service packet to which the target port label is added. After receiving the first service packet to which the target port label is added, the POP 300 sends the first service packet from the first port to the client 400 based on the target port label.

S106: The service scheduling apparatus 200 forwards the first service packet to the POP 300 based on a second routing table.

It should be understood that, during actual application, the following case may exist: A level label carried in the service packet does not match any level label in the first routing table. To implement forwarding of the service packet in the foregoing case, the service scheduling apparatus 200 further stores the second routing table. The second routing table includes prefixes of the plurality of network segment and a plurality of next-hop addresses. Similar to the first routing table, the prefixes of the plurality of network segment include the prefixes of the network segment to which the client requesting the service belongs, and the plurality of next-hop addresses are all IP addresses of the POP 300. In this way, when the target level label carried in the first service packet does not match any level label in the first routing table, the service scheduling apparatus 200 may still forward the first service packet to the POP 300, so that the client 400 may obtain the first service packet.

In addition, it can be learned from the foregoing descriptions that, to reduce costs consumed for detecting the network performance of the network segment, the service scheduling apparatus 200 may further perform S1032. If the service scheduling apparatus 200 performs S1032, the first routing table does not include prefixes of a part of network segments (namely, prefixes of network segments whose traffic is less than the threshold), so that destination IP addresses of a part of service packets do not belong to prefixes of any network segment in the first routing table.

The part of service packets cannot be forwarded based on the first routing table. Therefore, the second routing table may further include the prefixes of network segments whose traffic is less than the threshold and corresponding next-hop addresses (namely, IP addresses of the POP 300). In this way, the service scheduling apparatus 200 may forward the foregoing service packets to the POP 300, so that clients belonging to the network segments whose traffic is less than the threshold may obtain the service packets.

Optionally, the service scheduling apparatus 200 may design the first routing table and the second routing table by using a pipeline model, where the first routing table is used as a first-level routing table, and the second routing table is used as a second-level routing table. In this way, after obtaining the first service packet, the service scheduling apparatus 200 may first match the target level label and a destination IP address in the first service packet with the first routing table, and if the matching fails, match the destination IP address in the first service packet with the second routing table, to send the first service packet to the POP 300.

S107: The POP 300 sends the first service packet from a second port to the client 400.

Optionally, the second port and the first port may be a same port, or may be different ports. In a possible implementation, the POP 300 determines the second port according to the BGP route selection rule, and then sends the first service packet from the second port to the client 400. In another possible implementation, the POP 300 detects network quality of communication lines between a cloud network and the plurality of ISP networks, determines a line with optimal network quality, to determine the second port, and then sends the first service packet from the second port to the client 400.

S108: The client 400 receives the first service packet sent by the POP 300, and obtains content of the requested service based on the first service packet.

The following further describes the foregoing service scheduling method by using a example.

Figure 5:
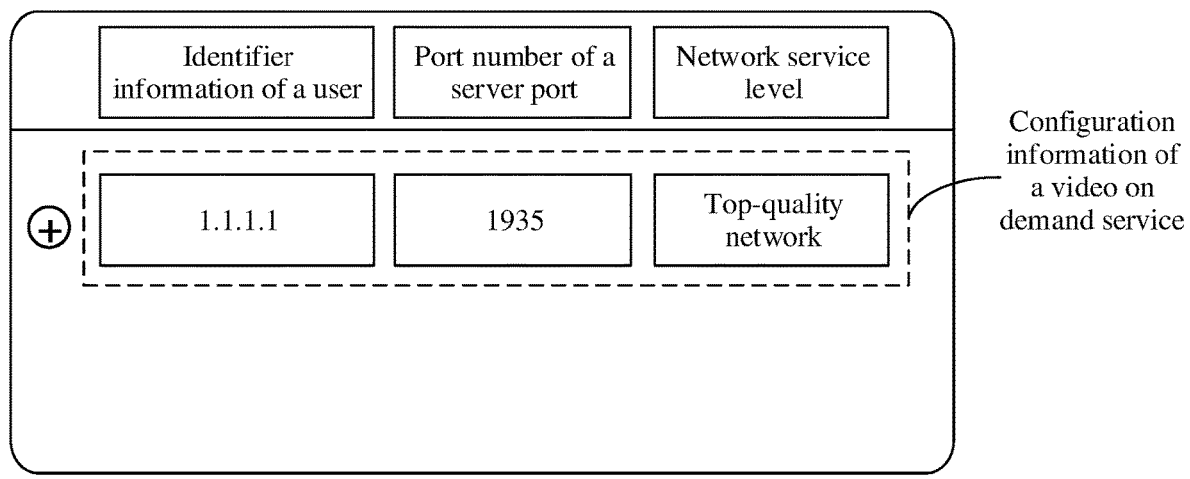
FIG. 5 is a schematic diagram of configuring a service by a user according to this application.

It is assumed that the user purchases an EIP service provided by the cloud vendor, to provide a video on demand service externally. According to the service scheduling method provided in this application, the user may input configuration information of the video on demand service on a UI provided by the service scheduling apparatus 200. As shown in FIG. 5, the configuration information of the video on demand service includes: the identifier information of the user (an EIP address of the EIP service purchased by the user herein, namely, 1.1.1.1), the port number of the server port (ALL, namely, all ports of the server 100), and a required network service level (the common network). Then, the service scheduling apparatus 200 may send a service packet of the video on demand service to a client by using the common network.

Figure 6:
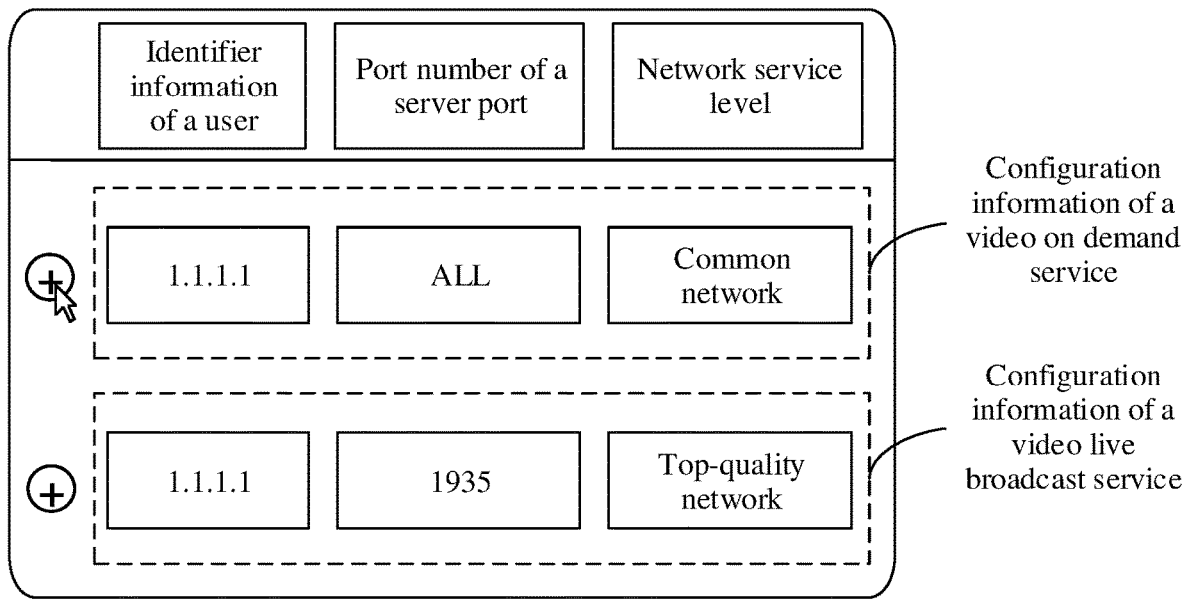
FIG. 6 is a schematic diagram of configuring a newly added service by a user according to this application.

After a period of time, the user expands the video live broadcast service, and expects that the video live broadcast service can use a better network resource. According to the method provided in this application, the user may continue to create new service configuration information on the UI shown in FIG. 5. As shown in FIG. 6, the user taps a "create" option on the UI, and inputs configuration information of the video live broadcast service. The configuration information of the video live broadcast service includes: the identifier information of the user (the EIP address of the EIP service purchased by the user herein, namely, 1.1.1.1), the port number (1935) of the server port, and the required network service level (the top-quality network). Then, the service scheduling apparatus 200 may send a service packet of the video live broadcast service to the client by using the top-quality network.

It can be learned that, according to the service scheduling method provided in this application, the service scheduling apparatus 200 may provide different levels of network resources for different services. In addition, when expanding a new service, the user may not need to purchase a new EIP service for the new service. The user may directly configure service configuration information of the new service based on the purchased EIP service. In this way, the service scheduling apparatus 200 may allocate a corresponding network resource to the new service by using the service configuration information of the new service, to provide the new service to the client.

The foregoing describes in detail the service scheduling method provided in this application with reference to FIG. 3 to FIG. 6. The following describes a service scheduling apparatus 200 and a computing device provided in this application with reference to FIG. 7 to FIG. 9.

In embodiments of this application, the service scheduling apparatus 200 is flexibly deployed, and may be deployed in a cloud environment. The cloud environment is an entity that a cloud vendor uses a basic resource to provide a cloud service for a user in a cloud computing mode. The cloud environment includes a cloud data center and a cloud service platform. The cloud data center includes a large quantity of basic resources (including a computing resource, a storage resource, and a network resource) that are provided by a cloud service provider. The service scheduling apparatus 200 may be a server that is in the cloud data center and that is configured to implement service scheduling, or may be a virtual machine that is created in the cloud data center and that is configured to implement service scheduling, or may be a software apparatus deployed on a server or a virtual machine in the cloud data center. The software apparatus is configured to implement service scheduling. The software apparatus may be independently deployed on the server or the virtual machine in the cloud data center. When the service scheduling apparatus 200 is the software apparatus, the service scheduling apparatus 200 may be logically divided into a plurality of parts, and each part has a different function (for the plurality of parts, refer to a plurality of functional units shown in FIG. 7 and related descriptions thereof in the following). Therefore, the service scheduling apparatus 200 may also be deployed on a plurality of servers in the cloud data center in a distributed manner, or deployed on a plurality of virtual machines in the cloud data center in a distributed manner, or deployed on the virtual machine and the server in the cloud data center in a distributed manner.

In some embodiments, the service scheduling apparatus 200 is abstracted by the cloud vendor on the cloud service platform into a service scheduling cloud service and provided to a cloud tenant. After the cloud tenant purchases the cloud service on the cloud service platform (the cloud service may be pre-charged and then settled based on a final resource usage), the cloud environment provides the service scheduling cloud service to the cloud tenant through the service scheduling apparatus 200 deployed in the cloud data center. When using the service scheduling cloud service, the user may input service configuration information by using a UI, and upload the service configuration information to the service scheduling apparatus 200 in the cloud environment. The service scheduling apparatus 200 completes configuration of a first routing table based on the received service configuration information and collected network data (including network performances of a plurality of network segments, route monitoring information, and the like). Then, after obtaining a first service packet, the service scheduling apparatus 200 may complete forwarding of the first service packet based on a target level label carried in the first service packet.

Figure 7:
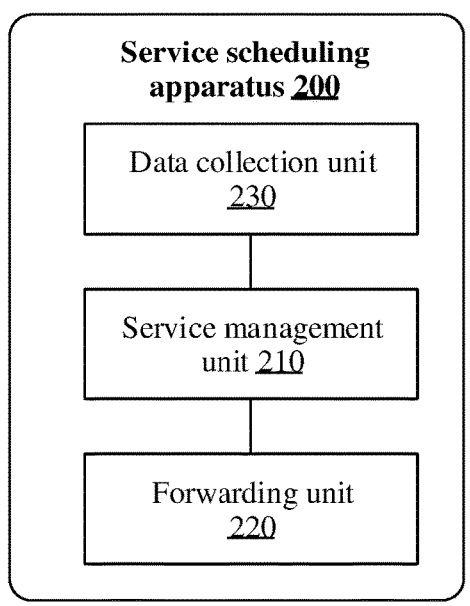
FIG. 7 is a schematic diagram of a structure of a service scheduling apparatus according to this application.

FIG. 7 is a schematic diagram of a structure of a service scheduling apparatus 200 according to this application. It should be understood that FIG. 7 shows only an example of a structure division manner of the service scheduling apparatus 200 based on functions. A structure division manner of the service scheduling apparatus 200 is not limited in this application. As shown in FIG. 7, the service scheduling apparatus 200 includes a service management unit 210, a forwarding unit 220, and a data collection unit 230. The service management unit 210, the forwarding unit 220, and the data collection unit 230 cooperate with each other, to implement the steps performed by the service scheduling apparatus 200 in the foregoing method embodiments The service management unit 210 is configured to perform S101 and steps S1035 to S1037. The forwarding unit 220 is configured to perform S102, the step of matching the target level label carried in the first service packet with the plurality of level labels in the first routing table in S103, and steps S104 to S106. The data collection unit 230 is configured to perform S1031 to S1034.

It should be noted that, in this embodiment of this application, the forwarding unit 220 may be deployed on the server or the virtual machine in the cloud environment, or may be deployed on a switch (for example, a P4 programmable switch).

Figure 8:
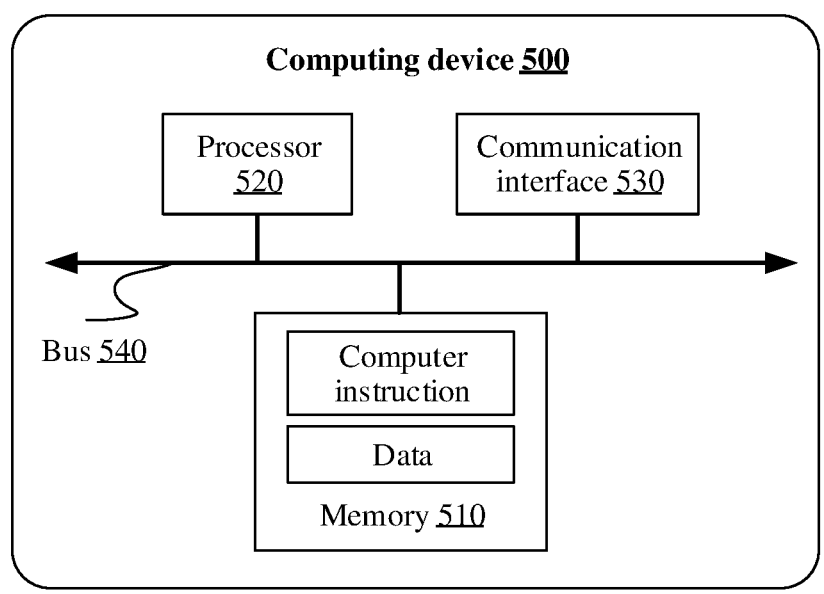
FIG. 8 is a schematic diagram of a structure of a computing device according to an embodiment of this application.

When the service scheduling apparatus 200 is independently deployed on a computing device in the cloud environment, the computing device on which the service scheduling apparatus 200 is deployed may be a computing device shown in FIG. 8. FIG. 8 is a schematic diagram of a hardware structure of a computing device 500 in which a service scheduling apparatus 200 is deployed. The computing device 500 includes a memory 510, a processor 520, a communication interface 530, and a bus 540. The memory 510, the processor 520, and the communication interface 530 may be communicatively connected to each other through the bus 540.

The memory 510 may be a read-only memory (ROM), a static storage device, a dynamic storage device, or a random access memory (RAM). The memory 510 may store computer instructions, for example, computer instructions in the service management unit 210, computer instructions in the forwarding unit 220, or computer instructions in the data collection unit 230. When a program stored in the memory 510 is executed by the processor 520, the processor 520 and the communication interface 530 are configured to perform some or all of the methods described in the foregoing steps S101 to S106. The memory 510 may further store data, for example, intermediate data or result data generated by the processor 520 in an execution process, for example, the service configuration information, a target level label, or a target port label that are input by the user.

The processor 520 may be a general-purpose central processing unit (CPU), a microprocessor, an application-specific integrated circuit (ASIC), a graphics processing unit (GPU), or one or more integrated circuits.

Alternatively, the processor 520 may be an integrated circuit chip and has a signal processing capability. In an implementation process, some or all functions of the service scheduling apparatus 200 may be implemented through an integrated logic circuit of hardware in the processor 520 or instructions in a form of software. The processor 520 may also be a general-purpose processor, a data signal processor (DSP), a field programmable gate array (FPGA) or another programmable logic device, a discrete gate, a transistor logic device, or a discrete hardware component. The processor 520 may implement or perform the methods, steps, and logical block diagrams that are disclosed in embodiments of this application. The general-purpose processor may be a microprocessor, or the processor may be any conventional processor or the like. Steps of the methods disclosed with reference to embodiments of this application may be directly executed and completed by using a hardware decoding processor, or may be executed and completed by using a combination of hardware and software modules in a decoding processor. The software module may be located in a mature storage medium in the art, such as the random access memory, a flash memory, the read-only memory, a programmable read-only memory, an electrically erasable programmable memory, or a register. The storage medium is located in the memory 510. The processor 520 reads information in the memory 510, and completes some or all functions of the service scheduling apparatus 200 in combination with hardware of the processor 520.

The communication interface 530 uses, by way of example rather than limitation, a transceiver module such as a transceiver, to implement communication between the computing device 500 and another device or a communication network. For example, the service configuration information input by the user may be obtained by using the communication interface 530, the first service packet or a first service packet to which the target level label is added may be sent to a POP 300.

The bus 540 may include a path for transmitting information between components (for example, the memory 510, the processor 520, and the communication interface 530) in the computing device 500.

Figure 9:
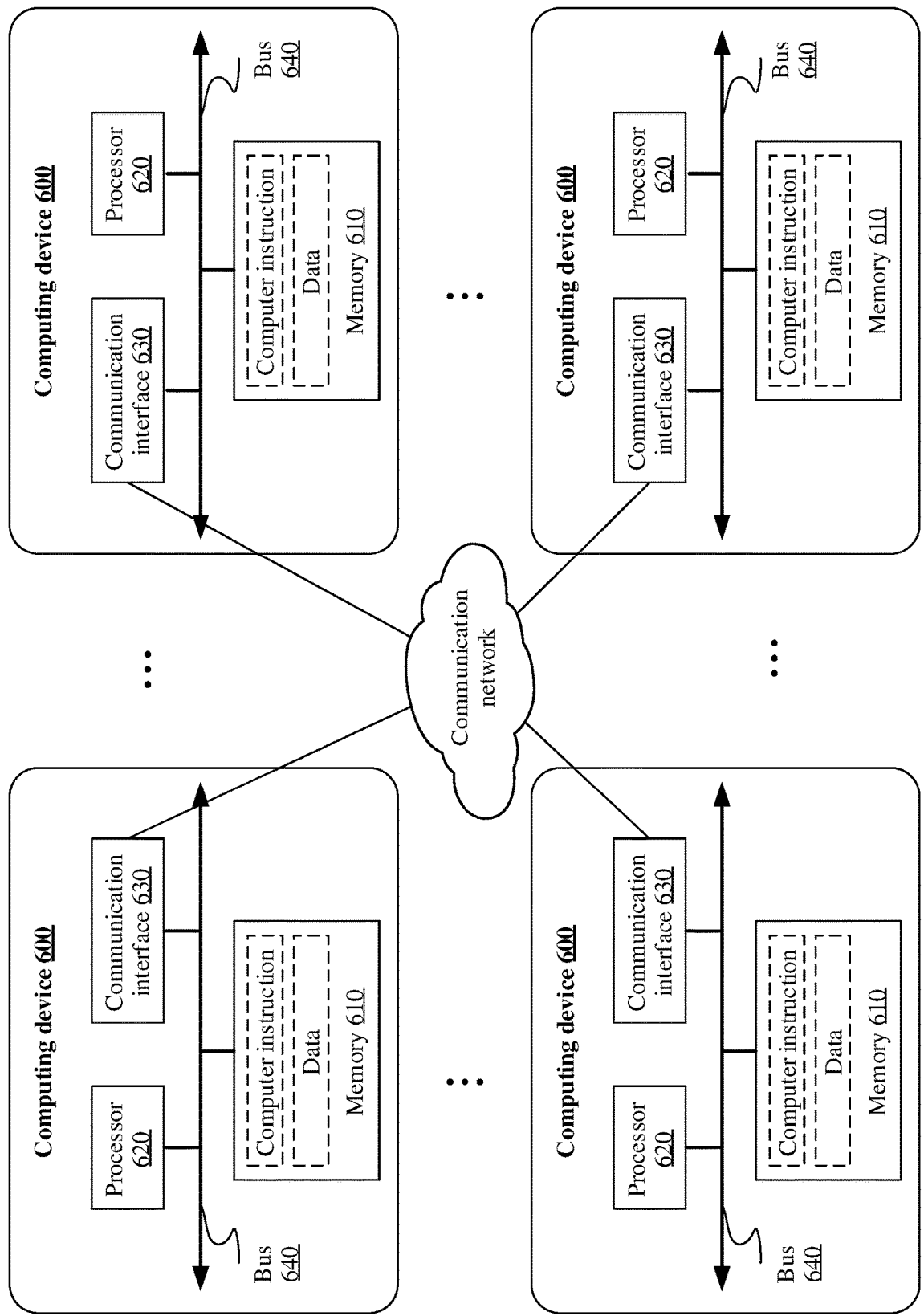
FIG. 9 is a schematic diagram of a structure of a computing device system according to this application.

When parts of the service scheduling apparatus 200 are deployed in a plurality of computing devices in the cloud environment in a distributed manner, the plurality of computing devices in which the service scheduling apparatus 200 is deployed may form a computing device system shown in FIG. 9. FIG. 9 is a schematic diagram of a hardware structure of a computing device system in which a service scheduling apparatus 200 is deployed. The computing device system includes a plurality of computing devices 600, and the plurality of computing devices 600 in the computing device system may cooperatively implement a function of the service scheduling apparatus 200 by executing computer instructions through an internal processor.

As shown in FIG. 9, each computing device 600 includes a memory 610, a processor 620, a communication interface 630, and a bus 640. The memory 610, the processor 620, and the communication interface 630 may be communicatively connected to each other through the bus 640.

The memory 610 may be a ROM, a RAM, a static storage device, or a dynamic storage device. The memory 610 may store computer instructions. When the computer instructions stored in the memory 610 are executed by the processor 620, the processor 620 and the communication interface 630 are configured to perform some of the methods described in steps S101 to S106. The memory 610 may further store data, for example, intermediate data or result data generated by the processor 620 in an execution process, for example, the service configuration information, a target level label, or a target port label that are input by the user.

The processor 620 may use a general-purpose CPU, a GPU, an ASIC, a microprocessor, or one or more integrated circuits. Alternatively, the processor 620 may be an integrated circuit chip and has a signal processing capability. In an implementation process, some or all functions of the service scheduling apparatus 200 in this application may be implemented through an integrated logic circuit of hardware in the processor 620 or instructions in a form of software. Alternatively, the processor 620 may be a DSP, an FPGA, another programmable logic device, a general-purpose processor, a discrete gate, a discrete hardware component, or a transistor logic device. The processor 520 may implement or perform the methods, steps, and logical block diagrams that are disclosed in embodiments of this application. The general-purpose processor may be a microprocessor, or the processor may be any conventional processor or the like. Steps of the methods disclosed with reference to embodiments of this application may be directly executed and completed by using a hardware decoding processor, or may be executed and completed by using a combination of hardware and software modules in a decoding processor. The software module may be located in a mature storage medium in the art, such as the random access memory, a flash memory, the read-only memory, a programmable read-only memory, an electrically erasable programmable memory, or a register. The storage medium is located in the memory 610. The processor 620 reads information in the memory 610, and completes some functions of the service scheduling apparatus 200 in combination with hardware of the processor 620.

The communication interface 630 uses, by way of example rather than limitation, a transceiver module such as a transceiver, to implement communication between the computing device 600 and another device or a communication network. For example, a first routing table calculated by another computing device may be obtained by using the communication interface 630, the first service packet or a first service packet to which the target level label is added may be sent to a POP 300.

The bus 640 may include a path for transmitting information between components (for example, the memory 610, the processor 620, and the communication interface 630) in the computing device 600.

A communication path is established between each computing device 600 by using the communication network. A part of the service scheduling apparatus 200 (for example, one or more of the service management unit 210, the forwarding unit 220, and the data collection unit 230 in the service scheduling apparatus 200) runs on each computing device 600.

The descriptions of procedures corresponding to the foregoing accompanying drawings have respective focuses. For a part of a procedure that is not described in detail, refer to related descriptions of another procedure.

All or some of the foregoing embodiments may be implemented by using software, hardware, or a combination thereof. When the software is used for implementation, all or some of embodiments may be implemented in a form of a computer program product. A computer program product that provides a service scheduling apparatus 200 includes one or more computing instructions executed by the service scheduling apparatus 200. When these computer program instructions are loaded and executed on a computer, all or some of the procedures or functions according to embodiments of this application are generated.

The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a twisted pair) or wireless (for example, infrared, radio, or microwave) manner. The computer-readable storage medium stores computer program instructions that provide the service scheduling apparatus 200. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a compact disc), a semiconductor medium (for example, a solid state disk (SSD)), or the like.

What is claimed is:

1. A service scheduling method, comprising:
   receiving, by a service scheduling apparatus, service configuration information, wherein the service configuration information comprises a network service level required by a service;
   obtaining, by the service scheduling apparatus, a first service packet, wherein the first service packet includes content and a target level label of the service, and the target level label is used to identify the network service level required by the service;
   matching, by the service scheduling apparatus, the target level label with a plurality of level labels in a first routing table, wherein the first routing table comprises the plurality of level labels, wherein each level label of the plurality of level labels corresponds to a port label;
   based on the target level label matching a first level label of the plurality of level labels, determining, by the service scheduling apparatus, a target port label based on the first level label obtained through matching, wherein the target port label is used to identify a target port of a point of presence (POP); and
   controlling, by the service scheduling apparatus, the POP to send the first service packet from the target port to a client.

2. The method according to claim 1, wherein the service configuration information further comprises a port number of a server port, and the obtaining, by the service scheduling apparatus, the first service packet comprises:
   receiving, by the service scheduling apparatus, a second service packet from a server via the server port, wherein the second service packet is a packet generated by the server in response to a service request of the service from the client; and
   adding, by the service scheduling apparatus, the target level label to the second service packet based on the port number of the server port, to obtain the first service packet.

3. The method according to claim 1, wherein the service configuration information further comprises a port number of a server port, and the obtaining, by the service scheduling apparatus, the first service packet comprises:
   sending, by the service scheduling apparatus, the service configuration information to a server, so that the server adds the target level label to a second service packet based on the port number of the server port, wherein the second service packet is a packet generated by the server in response to a service request of the service from the client; and receiving, by the service scheduling apparatus, the first service packet from the server via the server port, wherein the first service packet is the second service packet to which the target level label is added.

4. The method according to claim 1, wherein the controlling, by the service scheduling apparatus, the POP to send the first service packet from the target port to the client comprises:
adding, by the service scheduling apparatus, the target port label to the first service packet; and
sending, by the service scheduling apparatus to the POP, the first service packet to which the target port label is added, so that the POP sends the first service packet from the target port to the client based on the target port label.

5. The method according to claim 4, wherein before the matching, by the service scheduling apparatus, the target level label with the plurality of level labels in the first routing table, the method further comprises:
detecting, by the service scheduling apparatus, network performances of a network segment to which the client belongs on a plurality of ports of the POP, wherein the plurality of ports are connected to a plurality of internet service provider (ISP) networks;
selecting, by the service scheduling apparatus, M ports from the plurality of ports based on the network service level required by the service, wherein M is an integer greater than 1;
determining, by the service scheduling apparatus, that a network performance of the network segment is optimal on the target port in the M ports; and
obtaining, by the service scheduling apparatus, the target port label corresponding to the target port, and storing the target port label and the target level label to the first routing table in an associated manner.

6. The method according to claim 5, wherein before the detecting, by the service scheduling apparatus, the network performances of the network segment to which the client belongs on the plurality of ports of the POP, the method further comprises:
collecting, by the service scheduling apparatus, traffic of the network segment; and
determining, by the service scheduling apparatus, that the traffic of the network segment is greater than a threshold.

7. The method according to claim 1, wherein the method further comprises:
based on the target level label not matching any one of the plurality of level labels, forwarding, by the service scheduling apparatus, the first service packet to the POP based on a second routing table, wherein the second routing table comprises a next-hop address, and the next-hop address is an internet protocol (IP) address of the POP.

8. A computing device, comprising:
a processor; and
a memory, wherein the memory stores computer instructions, and when the processor executes the computer instructions, the processor is configured to cause the computing device to:
receive service configuration information, wherein the service configuration information comprises a network service level required by a service;
obtain a first service packet, wherein the first service packet includes content and a target level label of the service, and the target level label is used to identify the network service level required by the service;
match the target level label with a plurality of level labels in a first routing table, wherein the first routing table comprises the plurality of level labels, wherein each level label of the plurality of level labels corresponds to a port label;
based on the target level label matching a first level label of the plurality of level labels, determine a target port label based on the first level label obtained through matching, wherein the target port label is used to identify a target port of a point of presence (POP); and
control the POP to send the first service packet from the target port to a client.

9. The computing device according to claim 8, wherein the service configuration information further comprises a port number of a server port, and wherein the processor executing the computer instructions further causes the computing device to:
receive a second service packet from a server via the server port, wherein the second service packet is a packet generated by the server in response to a service request of the service from the client; and
add the target level label to the second service packet based on the port number of the server port, to obtain the first service packet.

10. The computing device according to claim 8, wherein the service configuration information further comprises a port number of a server port, and wherein the processor executing the computer instructions further causes the computing device to:
send the service configuration information to a server, so that the server adds the target level label to a second service packet based on the port number of the server port, wherein the second service packet is a packet generated by the server in response to a service request of the service from the client; and
receive the first service packet from the server via the server port, wherein the first service packet is the second service packet to which the target level label is added.

11. The computing device according to claim 8, wherein the processor executing the computer instructions further causes the computing device to:
add the target port label to the first service packet; and
send, to the POP, the first service packet to which the target port label is added, so that the POP sends the first service packet from the target port to the client based on the target port label.

12. The computing device according to claim 11, wherein before the matching the target level label with the plurality of level labels in the first routing table, the processor executing the computer instructions further causes the computing device to:
detect network performances of a network segment to which the client belongs on a plurality of ports of the POP, wherein the plurality of ports are connected to a plurality of internet service provider (ISP) networks;
select M ports from the plurality of ports based on the network service level required by the service, wherein M is an integer greater than 1;
determine that a network performance of the network segment is optimal on the target port in the M ports; and
obtain the target port label corresponding to the target port, and storing the target port label and the target level label to the first routing table in an associated manner.

13. The computing device according to claim 12, wherein before the detecting the network performances of the network segment to which the client belongs on the plurality of ports of the POP, the processor executing the computer instructions further causes the computing device to:
- collect traffic of the network segment; and
- determine that the traffic of the network segment is greater than a threshold.

14. The computing device according to claim 8, wherein the processor executing the computer instructions further causes the computing device to:
- based on the target level label not matching any one of the plurality of level labels, forward the first service packet to the POP based on a second routing table, wherein the second routing table comprises a next-hop address, and the next-hop address is an internet protocol (IP) address of the POP.

15. A non-transitory computer-readable storage medium storing computer instructions that, when executed by a processor, cause a computing device to:
- receive service configuration information, wherein the service configuration information comprises a network service level required by a service;
- obtain a first service packet, wherein the first service packet includes content and a target level label of the service, and the target level label is used to identify the network service level required by the service;
- match the target level label with a plurality of level labels in a first routing table, wherein the first routing table comprises the plurality of level labels, wherein each level label of the plurality of level labels corresponds to a port label;
- based on the target level label matching a first level label of the plurality of level labels, determine a target port label based on the first level label obtained through matching, wherein the target port label is used to identify a target port of a point of presence (POP); and
- control the POP to send the first service packet from the target port to a client.

16. The non-transitory computer-readable storage medium according to claim 15, wherein the service configuration information further comprises a port number of a server port, and wherein the processor executing the computer instructions further causes the computing device to:
- receive a second service packet from a server via the server port, wherein the second service packet is a packet generated by the server in response to a service request of the service from the client; and
- add the target level label to the second service packet based on the port number of the server port, to obtain the first service packet.

17. The non-transitory computer-readable storage medium according to claim 15, wherein the service configuration information further comprises a port number of a server port, and wherein the processor executing the computer instructions further causes the computing device to:
- send the service configuration information to a server, so that the server adds the target level label to a second service packet based on the port number of the server port, wherein the second service packet is a packet generated by the server in response to a service request of the service from the client; and
- receive the first service packet from the server via the server port, wherein the first service packet is the second service packet to which the target level label is added.

18. The non-transitory computer-readable storage medium according to claim 15, wherein the processor executing the computer instructions further causes the computing device to:
- add the target port label to the first service packet; and
- send, to the POP, the first service packet to which the target port label is added, so that the POP sends the first service packet from the target port to the client based on the target port label.

19. The non-transitory computer-readable storage medium according to claim 18, wherein before the matching the target level label with the plurality of level labels in the first routing table, the processor executing the computer instructions further causes the computing device to:
- detect network performances of a network segment to which the client belongs on a plurality of ports of the POP, wherein the plurality of ports are connected to a plurality of internet service provider (ISP) networks;
- select M ports from the plurality of ports based on the network service level required by the service, wherein M is an integer greater than 1;
- determine that a network performance of the network segment is optimal on the target port in the M ports; and
- obtain the target port label corresponding to the target port, and storing the target port label and the target level label to the first routing table in an associated manner.

20. The non-transitory computer-readable storage medium according to claim 15, wherein the processor executing the computer instructions further causes the computing device to:
- based on the target level label not matching any one of the plurality of level labels, forward the first service packet to the POP based on a second routing table, wherein the second routing table comprises a next-hop address, and the next-hop address is an internet protocol (IP) address of the POP.

* * * * *